Dec. 18, 1934.   W. S. BOEHM   1,985,012

SWIVEL

Filed Aug. 12, 1933   2 Sheets-Sheet 1

William S. Boehm,
Inventor,
Delos G. Haynes,
Attorney.

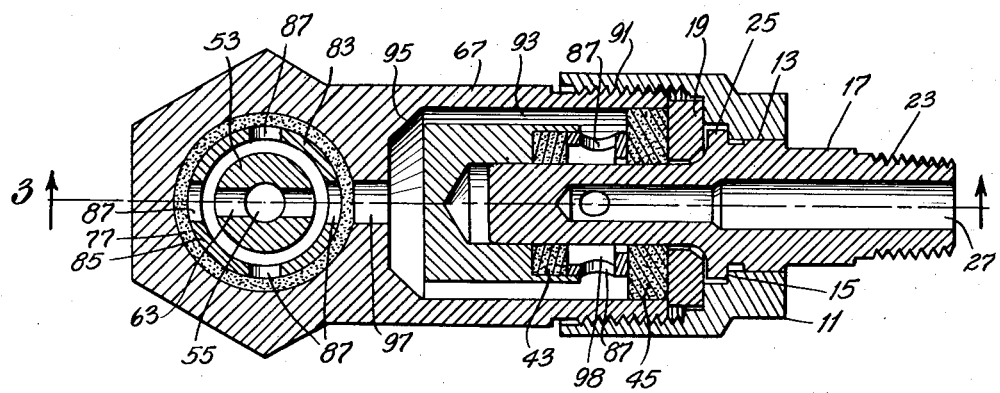
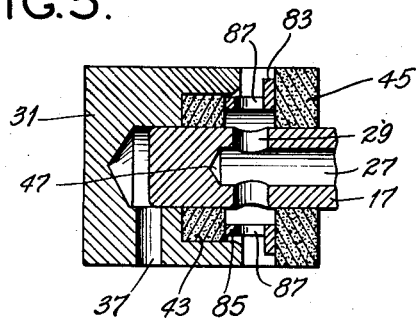

Patented Dec. 18, 1934

1,985,012

UNITED STATES PATENT OFFICE 1,985,012

SWIVEL

William S. Boehm, St. Louis, Mo., assignor to Lincoln Engineering Company, St. Louis, Mo., a corporation of Missouri Application August 12, 1933, Serial No. 684,792

3 Claims. (Cl. 285—9)

This invention relates to swivels, and with regard to certain more specific features, to rotary swivels for accommodating fluid lines under relatively high fluid pressures.

Among the several objects of the invention may be noted the provision of a rotary swivel which is easily operable under both high and low fluid pressures; the provision of a swivel of the class described having a low frictional resistance to applied torque; the provision of a swivel of the class described in which the pressure of the fluid is balanced against the various elements, so that no one element is forced into tighter engagement with any other element by the fluid pressure; and the provision of apparatus of the class described which is simple and economical to manufacture and assemble. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is an axial section of one embodiment of the invention;

Fig. 4 is an axial section of the embodiment of Fig. 3, taken substantially on line 4—4 of Fig. 3; and, Fig. 5 is an axial section of a construction alternative to that of certain elements shown in Figures 3 and 4.

Similar reference characters indicate corresponding parts throughout the several views of the drawings.

In swivels of the general type herein considered, it has heretofore been the custom to provide a construction wherein pressure of the fluid in the swivel is applied to one of the swivel elements in such a manner as to force it more tightly against a second swivel element. This tightening under pressure invariably results in increased friction between the elements of the swivel when in operation, the increased friction making it difficult to swivel the elements one upon the other in the manner for which the swivel was intended. The construction of the present invention is such that the pressure of the fluid entering the swivel does not react against any one element in such a manner as to force it into tighter engagement with an element telescoping therewith. On the contrary, the present invention provides a construction whereby the pressure of the fluid is distributed equally in both directions upon each of the swivel elements, whereby it is impossible for it to build up any greater pressure on one portion of the element than on the other, and hence with the swivel of the present invention, no increased frictional resistance is encountered when the device contains fluid under pressure, and turning of the swivel is thereby facilitated.

Figure 1:
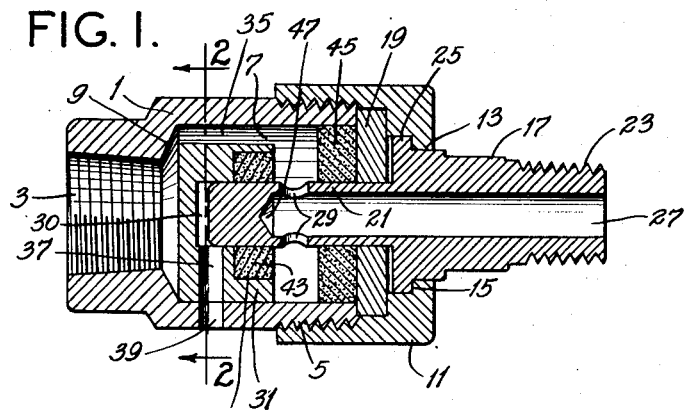

Referring now more particularly to Fig. 1, there is illustrated what may be termed the simplest embodiment of the invention, wherein the swivel motion is effected between two members on a common axis. Numeral 1 indicates a hollow cylindrical member which is provided at one end with a female threaded portion 3 to receive a connecting means, and which is outwardly threaded on the other end 5. The interior of the member 1 is hollow, constituting a cylindrical recess 7 terminated by a shoulder 9. Threaded onto the end 5 of the body 1 is a cap 11, which is centrally bored as at numeral 13 to receive a nipple 17. Between the cap 11 and the end 5 of the body 1 is clamped a disc 19, which is centrally bored to receive a reduced diameter portion 21 of the nipple 17.

The nipple 17 is outwardly threaded on its end 23 to connect to a hose or the like. Extending sidewardly from the nipple 17 is a flange 25 which fits into the counterbore 13. The shoulder of the counterbore 15 and the disc 19 together limit axial movement of the nipple 17 in the assembly.

The nipple 17 is centrally bored as at numeral 27 to provide an outlet for the fluid. The bore 27 does not go from end to end of the nipple, however. Towards the inner end of the nipple 17, sidewardly facing openings 29 are provided leading from the outside of the nipple 17 to the bore 27. The bore 27, however, extends somewhat beyond the openings 29, as illustrated, before it terminates.

The inner end of the nipple 17 fits into a suitable bore 30 centrally provided in a guide member 31, the member 31 being pressed tightly within the cylindrical recess 7 in the body 1. The member 31 has sideward flats 33, which provide axial passages 35 along the member 31. Extending radially outwardly from the bore 30 is a passage 37, which coincides with a passage 39 through the body 1. On the right hand face of the member 31 there is provided an annular recess 41 into which is fitted a gasket or packing means 43. The gasket 43 embraces the nipple 17 tightly.

Also surrounding the nipple 17, on the opposite side of the openings 29, is a packing or gasket 45, which in normal position fits against the inner face of the disc 19 and the inner walls of the cylindrical recess 7.

The operation of the swivel as thus described is as follows:

Assuming that grease, for example, is the fluid being conducted, grease under high pressure is admitted at the inlet 3, passes around the member 31 by way of the passages 35, and into the central bore 27 of the nipple 17 through openings 29. When there is no obstruction to the flow of grease at a point farther in the line attached to the nipple 17, it will be seen that there is no relative pressure set up within the swivel, and the nipple member 17 may readily turn with respect to the body member 1. However, under normal operating conditions, there are obstructions to the flow of grease in the line attached to nipple 17, and hence a back pressure of grease is set up within the swivel. Still no relative pressure is set up within the swivel, for the reason that the grease pressure exerts a force directed to the left against the end 47 of the bore 27, equal to the pressure to the right against the obstruction present in the line attached to the nipple 17. The grease pressure within the body 1 is also equalized, the force to the right against the gasket 45 being equal to the force to the left against the gasket 43 and/or the means supplying grease under pressure to the inlet 3. Hence, with no relative pressure differential between any of the elements of the swivel, or parts thereof, there is substantially no increased frictional resistance set up and the nipple 17 still swivels within the body 1 in a free, unimpeded manner. Thus, with the embodiment of the invention as described, a swivel is provided in which substantially no increased frictional resistance to torque is set up regardless of the grease pressure in the line.

A relatively small amount of grease leakage will take place in the swivel. In the one direction, grease will leak past the packing 43 and through the small space between the nipple 17 and the bore 30, to the passage 37, whence it can pass from the swivel by way of the pasasge 39. Such grease leakage is in relatively small amount and serves the useful purpose of keeping the bearing surface between the nipple 17 and the bore 30 properly lubricated. From time to time, what grease leaks out in this direction may be wiped from the casing 1 with a rag. In the other direction some grease leakage may take place past the packing 45, through the central hole in the disc 19, and out along the bearing surfaces between the nipple 17 and the cap 11. This leakage likewise serves to lubricate the swiveling action of the nipple 17 and hence is useful. This slow grease leakage may be characterized as a slight bleeding of the grease between the relatively rotatable members.

Figure 3:
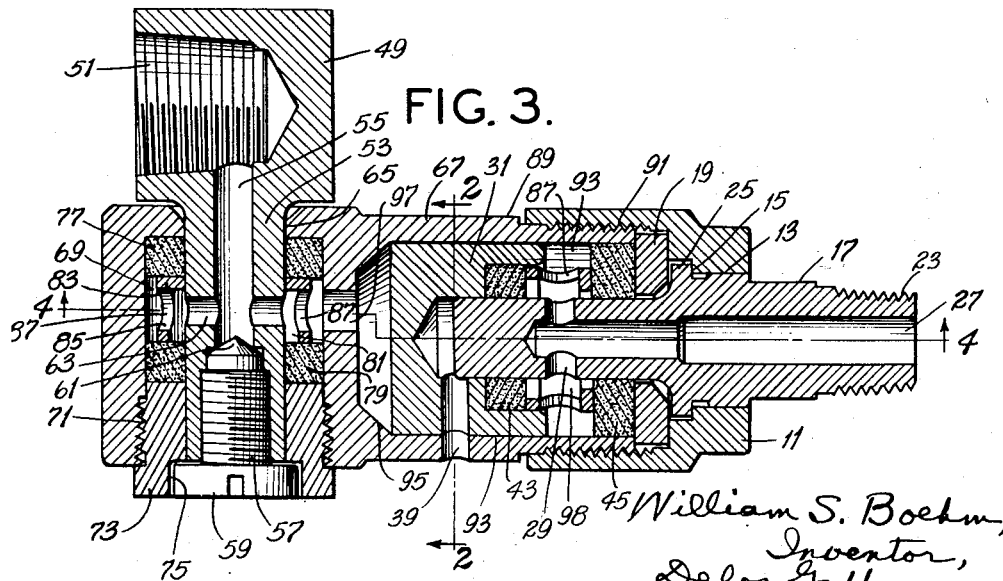
Fig. 3 is an axial section of a second embodiment of the invention.

In Figures 3 and 4 is shown a relatively more complex modification of the basic form of swivel comprising the present invention. This embodiment provides for universal movement, instead of unidirectional relative rotational movement as in the case of the Fig. 1 embodiment. Referring now more particularly to Figures 3 and 4, numeral 49 indicates an inlet block portion having a threaded recess 51 for receiving the fluid inlet line. Extending from the block 49 in a direction at right angles to the axis of the recess 51 is a nipple portion 53, which has a central bore 55. The end of the nipple 53 opposite the block 49 is threaded to receive a screw 57, the head 59 of which serves to hold the nipple in position as will be indicated hereinafter. The point 61 of the screw 57 forms an end for the central bore 55. A cross bore 63, analogous to the openings 29 in the Fig. 1 embodiment, is provided. The nipple 53 is received into a suitable bore 65 in a body member 67. Coaxially with the nipple 53, the body member 67 is provided with a cylindrical recess 69, one end of which is threaded as at numeral 71 to receive a hollow plug 73 having a suitable polygonal head to be engaged by a wrench. The plug 73 has a central recess 75 which receives the head 59 of the screw 57. With the plug 73 drawn up tightly into the body portion 67, and the screw 57 drawn up tightly into the nipple 53, it will be seen that the nipple 53 is held in rigid, rotatable assembly with the body 67.

While the nipple 53 is shown as extending at right angles to the threaded recess 51, it will be understood that it may also be provided in a position coaxially with said recess 51, if the occasion demands.

Within the recess 69 are two gaskets 77 and 79, the gasket 77 fitting against the closed tube portion of the body 67 and relatively sealing against the joint between the nipple 53 and the casing 67, while the other gasket 79 seats against the inner face of the plug 73, and seals the two joints between the nipple 53 and the plug 73, and between the plug 73 and the body 67. To space the gaskets 77 and 79 apart, a spacing spider 81 is provided. The spider 81 comprises an annular portion 83 with a flange 85 depending at right angles from the outer periphery thereof. The flange 85 is in effect a cylinder, and is provided with a suitable number (four in the present embodiment) of openings 87.

The body portion 67 extends to one side from the recess 69 and terminates as a cylindrical portion 89 having a threaded end 91, thus providing a cylindrical recess 93 inwardly terminated by a shoulder 95. A passage 97 connects the recess 69 with the recess 93. The portion of the swivel included within the recess 93 is substantially identical to the embodiment illustrated in Fig. 1, and for this reason will not be redescribed herein. However, a spacer 98 analogous to the spacer 81 in the left-hand side of this embodiment is provided between the gaskets 43 and 45. In other instances, the same reference characters are used in Fig. 3, at the right-hand end, as are used in Fig. 1.

The operation of this embodiment is as follows: Grease is admitted to the nipple 51 and passes through the bore 55 and out into the recess 69 through the openings 63 and the openings 87. Inasmuch as the bore 55 extends beyond the openings 87, to a termination on the end of screw 57, there is no unequal pressure here and hence the swivel will operate without frictional resistance even when grease is being pumped. The passage 97 conducts the grease into the recess 93, whence it passes through the passages 35 provided by the flats 33 on the body 31 and thus into the recess 93 at the region of the gasket separator 98. It passes into the holes 87 in said separator 98, and through the passages 29, into the bore 27 of swivel 17. Thence it passes, usually through a hose or the like, to the fluid receiving station.

As this right-hand part of the embodiment of Fig. 3 is identical with the embodiment of Fig. 1, frictional resistance due to increasing fluid pressure is likewise eliminated in this portion of the Fig. 3 embodiment. Due to the balancing of the pressures, thus, no frictional resistance is set up towards any direction of the universal movement desired.

Grease leakage in relatively small amount is also provided for in this embodiment, as in the Fig. 1 embodiment. The first point of leakage comprises the gasket 77 and the joint of the body 67 and the nipple 53. Such limited leakage at this point keeps the body 49 lubricated at its joint with the body 67.

In the other direction, a small amount of grease leaks past the gasket 79 and out past the screw 71, and along the bearing surface between the swivel member 49 and the plug 57, and, to a slight extent, along the screw 59. Inasmuch as all of these leaks together do not total up to any considerable amount, they are not objectionable, and rather serve to keep the device well lubricated for free movement of the swiveling parts.

The functioning of the right-hand swivel part of Fig. 3 is so like the functioning of the Fig. 1 embodiment, with regard to grease leakage, that no further description thereof need be given.

Figure 2:
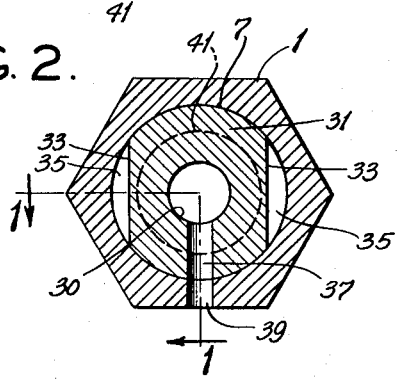
Fig. 2 is a cross section taken on line 2—2 of Fig. 1.

It is to be noted that while Fig. 2 represents fundamentally a section taken on line 2—2 of Fig. 1, it likewise constitutes a section of the Fig. 3 embodiment, when taken on line 2—2.

Fig. 5 shows an alternative form of gasket spacer. In this modification, the cylindrical portion 85 of the spacer is formed as a flange on the inner periphery of the annulus 83. The customary holes 87 are present in the cylindrical portion 85. There is no substantial difference in the functioning of this type of spacer and of the type of spacer illustrated in Figures 3 and 4.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A swivel comprising a cylindrical body portion, said body portion having an inlet at one end thereof, a cap threadedly received on the other end of said body portion, a disc clamped between said cap and said body portion, a nipple extending into said body portion and having a flange received between said cap and said disc, whereby rotation of said nipple with respect to said body portion is permitted but axial movement of said nipple with respect to said body portion is restricted, said nipple being provided with a longitudinal bore extending substantially throughout its length, and at least one sideward bore in said nipple spaced from the inner end of said longitudinal bore but in communication with the interior of said body portion, and a member received in the interior of said body portion and having a central bore receiving the end of said nipple, said last-named member being provided with passages whereby fluid may be passed from the inlet of said body portion to the sideward bore of said nipple portion.

2. A swivel comprising a cylindrical body portion, said body portion having an inlet at one end thereof, a cap threadedly received on the other end of said body portion, a disc clamped between said cap and said body portion, a nipple extending into said body portion and having a flange received between said cap and said disc, whereby rotation of said nipple with respect to said body portion is permitted but axial movement of said nipple with respect to said body portion is restricted, said nipple being provided with a longitudinal bore extending substantially throughout its length, and at least one sideward bore in said nipple spaced from the inner end of said longitudinal bore but in communication with the interior of said body portion; and a member received in the interior of said body portion and having a central bore receiving the end of said nipple, said last-named member being provided with passages whereby fluid may be passed from the inlet of said body portion to the sideward bore of said nipple portion, said last-named member having a sideward passage connecting with the central bore therein, and a passage through the walls of said body member aligned with said last-named passage.

3. A swivel comprising a cylindrical body portion, said body portion having an inlet at one end thereof, a cap threadedly received on the other end of said body portion, a disc clamped between said cap and said body portion, a nipple extending into said body portion and having a flange received between said cap and said disc, whereby rotation of said nipple with respect to said body portion is permitted but axial movement of said nipple with respect to said body portion is restricted, said nipple being provided with a longitudinal bore extending substantially throughout its length, and at least one sideward bore in said nipple spaced from the inner end of said longitudinal bore but in communication with the interior of said body portion, and a member received in the interior of said body portion and having a central bore receiving the end of said nipple, said last-named member being provided with passages whereby fluid may be passed from the inlet of said body portion to the sideward bore of said nipple portion, and packing means between said nipple and said body portion and between said nipple and said last-named member, said packing means providing against substantial fluid leakage but permitting sufficient fluid leakage to provide for lubrication between said nipple, said body, and said last-named member.

WILLIAM S. BOEHM.